United States Patent
Jonson

(10) Patent No.: US 7,045,918 B2
(45) Date of Patent: May 16, 2006

(54) APPARATUS AND METHOD FOR SUSPENDING A STATOR CORE OF AN ELECTRIC GENERATOR

(75) Inventor: Leif Jonson, Västeras (SE)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/396,400

(22) Filed: Mar. 26, 2003

(65) Prior Publication Data

US 2004/0000819 A1    Jan. 1, 2004

(30) Foreign Application Priority Data

Mar. 26, 2002  (SE)  .................................. 0200929

(51) Int. Cl.
  *H02K 5/24* (2006.01)
  *H02K 5/26* (2006.01)
(52) U.S. Cl. .................. 310/51; 310/258; 310/259
(58) Field of Classification Search ................ 310/51, 310/89, 91, 254, 258, 259
  See application file for complete search history.

(56) References Cited

U.S. PATENT DOCUMENTS

| | | | | |
|---|---|---|---|---|
| 2,320,843 | A | * | 6/1943 | Baudry ........................ 310/258 |
| 2,554,226 | A | * | 5/1951 | Taylor ......................... 310/258 |
| 4,975,613 | A | * | 12/1990 | Brem et al. .................. 310/258 |
| 6,091,177 | A | | 7/2000 | Carbonell et al. ............. 310/91 |
| 6,144,129 | A | * | 11/2000 | Fuller et al. ................... 310/91 |
| 2002/0074884 | A1 | | 6/2002 | Fuller ........................... 310/91 |

FOREIGN PATENT DOCUMENTS

| | | | |
|---|---|---|---|
| FR | 2.192.407 | | 7/1972 |
| GB | 1162998 | | 9/1969 |
| JP | 355043925 | * | 3/1980 |
| JP | 355046844 | * | 4/1980 |
| JP | 405219682 | * | 8/1993 |
| JP | 410014163 | * | 1/1998 |

OTHER PUBLICATIONS

Search Report from GB 0306965.5 (Dec. 12, 2003).
Search Report from Swedish Patent Office for corresponding Swedish application, dated Oct. 18, 2002.

* cited by examiner

*Primary Examiner*—Darren Schuberg
*Assistant Examiner*—David W. Scheuermann
(74) *Attorney, Agent, or Firm*—Cermak & Kenealy, LLP; Adam J. Cermak

(57) ABSTRACT

An apparatus and method for suspending a stator core (100) in an electric generator upon a foundation (206), where two natural modes of vibration, including known second and third modes, are excited in the core, each mode having four loops and four nodes displaced 45 degrees between the second and third modes. A non-rigid connection (212) connects a yoke to the foundation, and two connection members connect the yoke to the stator core at opposite sides of the non-rigid connection. The two connection points (210*a,b*) are located at adjacent loops of one of the second and third vibration modes. By this arrangement, radial deflections of the stator core at the respective connection points are transferred into a rocking movement of the yoke around the non-rigid connection. Thereby, vibrations transferred to the foundation are considerably reduced during operation.

6 Claims, 3 Drawing Sheets

APPARATUS AND METHOD FOR SUSPENDING A STATOR CORE OF AN ELECTRIC GENERATOR

This application claims priority under 35 U.S.C. § 119 to Swedish patent application number 0200929-8, filed on Mar. 26, 2002, the entirety of which is incorporated by reference herein.

TECHNICAL FIELD

The present invention relates generally to an apparatus and method for vibration-free suspension of an electric generator. In particular, the invention relates to a suspension structure for suspending the stator core of the generator.

BACKGROUND OF THE INVENTION AND PRIOR ART

In electric generators, energy is transferred between a mechanical state and an electrical state by means of a generated magnetic field and windings in a rotating rotor and a stationary stator, in a well-known manner. Cyclical forces are then exerted on the stator and its supporting structure as the rotor rotates, giving rise to vibrations and noise. Excessive vibrations in combination with a high static load may also lead to material fatigue and damages of the supporting structure parts. In particular, such vibration and load problems are serious and difficult to combat in the case of very large and heavy machines, such as electric generators in power plants.

Moreover, sudden shock loads may occur in electric generators due to short circuit conditions or synchronising faults. For example, an electric generator may experience instant tangential torque loads as high as twenty times, or more, the normal operating torque during a synchronising fault, which creates a shock pulse in the machine. In the worst case, the supporting structure may be damaged and accidents may happen.

Typically, a stator core of an electric generator is built up from metal sheets formed as segments, distributed circumferentially around the rotor, and being further axially packed in plural layers. Each sheet segment in one layer overlaps two sheet segments in an adjacent layer, and the sheet package is axially clamped together as a rigid ring-shaped or tube-shaped structure by means of axially extending clamping bolts or the like.

The stator core is thus subjected to radial forces and counter-forces due to the magnetic field as the rotor rotates, which result in an oscillating elastic deformation of the core mainly in a radial direction. These radial oscillations tend to be transmitted over the supporting structure to the foundation upon which the generator rests, imposing vibrations thereto, which are undesirable for reasons mentioned above.

Various solutions have been proposed previously to isolate such vibrations from the foundation. Vertical leaf springs are commonly used for suspending a stator core, absorbing stator movements substantially in a horizontal plane, by elastic deformation of the leaf springs.

U.S. Pat. No. 6,091,177 discloses a suspension structure, where the stator core frame 11 of an electric generator is connected to a tapered spring bar 12 at axially dispersed attachment points 13. The spring bar 12 is connected to the upper part of a vertically extending spring plate 15 at axially dispersed connection points 16, interposed between said attachment points 13. The lower part of the spring plate 15 is finally connected to a foundation 17.

This suspension structure is resilient in a horizontal plane by means of the spring plate 15, and also in a vertical plane by means of the tapered spring bar 12. The suspension structure further includes a horizontally extending stabilisation bar 19 to provide necessary horizontal support. The spring plate 15 provides vertical support for the stator's dead weight and isolates horizontal vibrations of the stator from the foundation, whereas the tapered spring bar 12 is intended to isolate vertical vibrations.

However, this arrangement requires that the suspension parts are carefully designed in order to "tune" a resonant torsional frequency of the system, to minimise vibrations transmitted to the foundation. In general, suspension structures similar to the one described above, i.e., using resilient spring elements for absorbing vibrations, must be carefully designed and optimised if both the vibration isolation and the necessary static load support are to be achieved. A relatively stiff structure provides a solid static load support, but is less successful in isolating vibrations, and vice versa. Moreover, the entire deflection movement and vibration energy of a stator core is taken up by deformation of the spring elements, which puts high demands on the spring elements to withstand wear and fatigue.

It is highly desirable to isolate a foundation from vibrations in a stator core of an electric generator, in order to avoid noise and fatigue. It is also desirable to reduce dynamic loads from stator vibrations imposed on the support structure parts. It is also desirable to reduce the effects of shock forces on the foundation and the support structure. Further, it is desirable to provide a simple suspension structure, which does not require a high design accuracy and complexity, yet being reliable in withstanding static, dynamic and shock loads, also minimising noise and fatigue.

SUMMARY OF THE INVENTION

The object of the present invention is to reduce or eliminate the problems outlined above. This object and others are obtained by providing an apparatus and method for suspending a stator core in an electric generator upon a foundation, which is simple in construction and reliable in withstanding static, dynamic and shock loads, also minimising noise and fatigue. Natural modes of vibration are excited in the stator core during operation, including a known second vibration mode with four circumferentially distributed loops and four nodes being displaced 45 degrees from the loops, and a known third vibration mode with four loops and four nodes displaced 45 degrees in relation to the loops and nodes of the second vibration mode.

The inventive apparatus comprises a yoke, a non-rigid connection between the yoke and the foundation, and two connection members connecting the yoke and the stator core at connection points on opposite sides of the non-rigid connection. The connection points are located on the stator core substantially at two adjacent loops of one of the second and third vibration modes, such that radial deflections of the stator core at the respective connection points are transferred into a rocking movement of the yoke around the non-rigid connection.

BRIEF DESCRIPTION OF THE DRAWINGS

The present invention will now be described in more detail and with reference to the accompanying drawings, in which.

DESCRIPTION OF PREFERRED EMBODIMENTS

The present invention takes advantage of the natural modes of vibration typically occurring in the stator core of an electric generator, due to dynamic forces on the stator core imposed by a generated magnetic field, when using a two-pole rotor. In many electric generators, the natural frequency of the vibration modes in the stator core unfortunately happens to be approximately twice the rotation speed of the rotor being commonly used in order to optimise the electric performance.

Figure 1A:
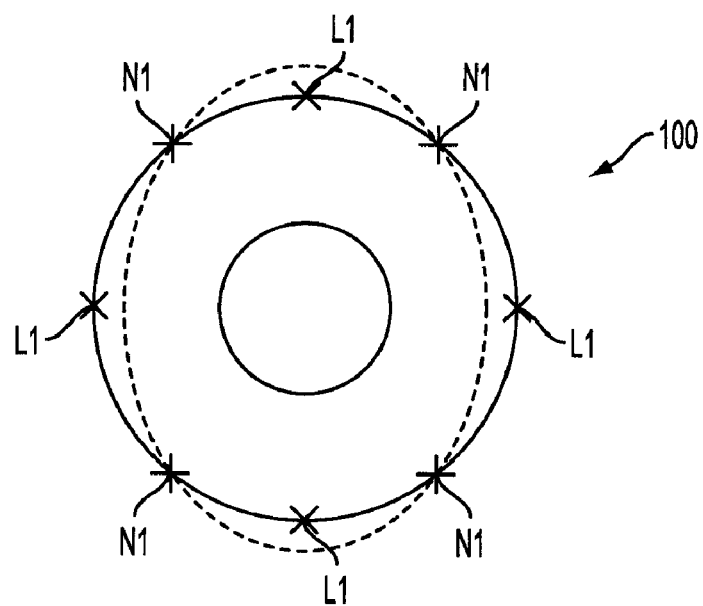
FIGS. 1a and 1b illustrate two known natural modes of vibration in a stator of an electrical generator.
Figure 1B:
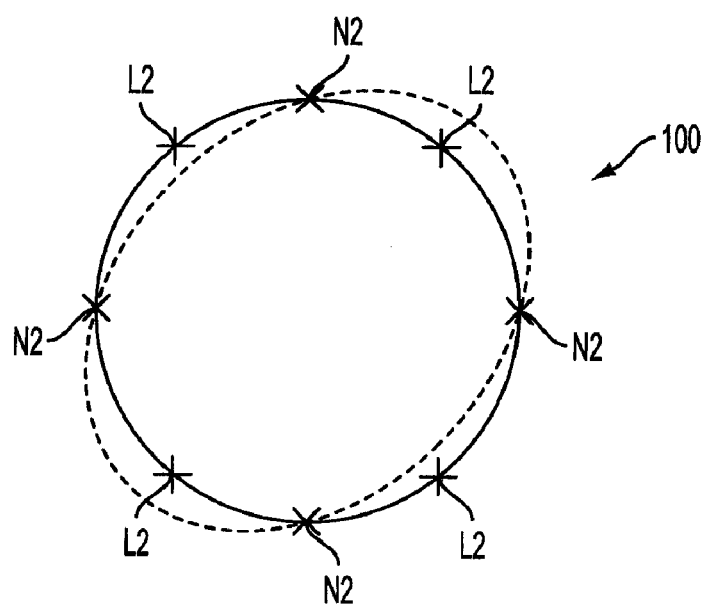

The resonance pattern of a ring-shaped or tube-shaped stator core includes two superposed modes of vibration in the form of radial oscillations, which are illustrated in FIGS. 1a and 1b, respectively. In the figures, a continuous circle represents the outer periphery of the stator core when undeformed, and a dashed ellipse represents the mode shape, i.e. the outer periphery of the stator core when deformed according to the respective vibration mode.

It is generally known that a tube-shaped or ring-shaped body has a number of natural modes of vibration, of which the first mode is a uniform and radial expansion and contraction oscillation, sometimes referred to as the "breathing mode".

FIG. 1a illustrates generally the known second mode of vibration in a stator core 100, in which the core is deformed elastically such that its outer periphery oscillates radially in a fixed pattern, having four loops L1 at north, west, south and east positions in the figure. Thus, the radial deflection back and forth is the highest at the loop positions L1. In this second mode, there are also four nodes N1 at north-east, south-east, south-west and north-west positions, where the radial deflection is zero. The nodes N1 are thus displaced 45 degrees in relation to the loops L1.

FIG. 1b illustrates generally the known third mode of vibration in the stator core 100, having a fixed pattern with four loops L2 and four nodes N2, as in the second mode, but being displaced 45 degrees, as compared to the pattern of the second mode. Thus, the loops L2 of the third mode are located at north-east, south-east, south-west and north-west positions, coinciding with the nodes N1 of the second mode. Consequently, the nodes N2 of the third mode are located at north, west, south and east positions, coinciding with the loops L1 of the second mode.

The resonance pattern described above is excited in the stator core in electrical generators by magnetic forces and counter-forces as the rotor rotates therein. The rotation speed is dictated by the alternating current frequency required. A two-pole generator typically rotates at 3000 rpm for providing an alternating current of 50 Hz, which give rise to excitation forces on the stator core at 100 Hz. In order to obtain an optimal electric performance in the generator, the stator core should be designed as having dimensions which unfortunately results in a natural frequency close to 100 Hz. The radial deformation amplitude of the stator core is then maximised, since the cyclic magnetic forces acting on the core coincide with the natural frequency.

In previous attempts to minimise stator core vibrations, the stiffness of the core has been increased by selecting a large outer diameter, which however is expensive and involves problems with supporting a higher static load, among other disadvantages.

Figure 2:
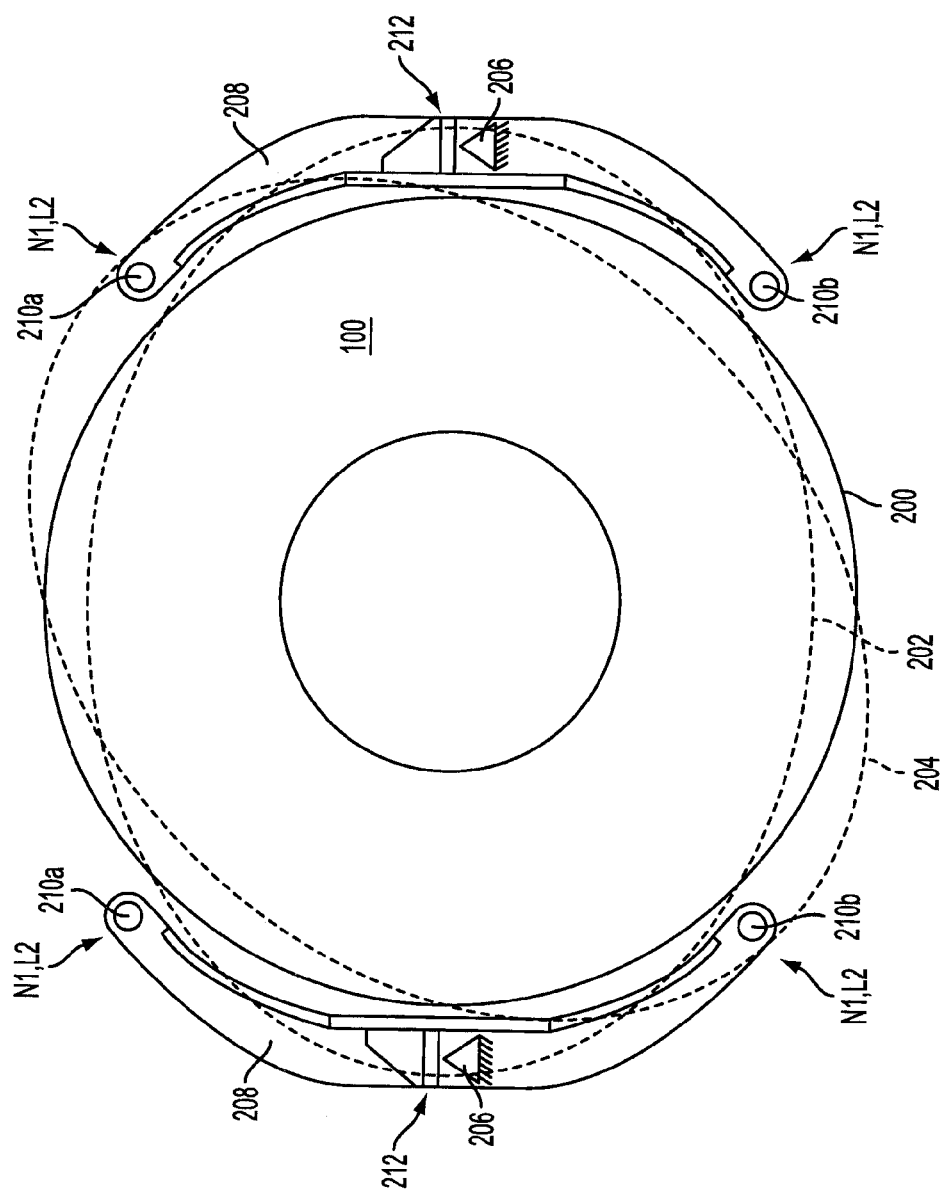
FIG. 2 is a schematic view of a first embodiment of a stator core suspension structure.

A first preferred embodiment of the present invention is illustrated schematically in FIG. 2, where a continuous circle 200 represents the outer periphery of a stator core 100 when undeformed. A first dashed ellipse 202 and a second dashed ellipse 204 represent the outer periphery deflection of the stator core when deformed according to the known second and third modes of vibration, respectively. The second and third vibration modes are thus added, acting simultaneously in an overlaid manner. The deflection from the continuous circle 200 is exaggerated in the ellipses 202, 204 for illustrative purposes. In reality, the maximum deflection is typically in the range of 20–30 µm.

By using the present invention, a rotation speed can be used which excites the known second and third vibration modes, and the stator core can be designed with any suitable diameter and stiffness. The inventive solution does not attempt to suppress vibrations in the stator core 100, but the vibrations are instead effectively isolated from a foundation upon which the stator rests, by the following arrangement.

The foundation is schematically illustrated as two fixed triangles 206 at opposite sides of the core 100. The core 100 is in this example suspended by means of two opposite yokes 208, or the like, each being connected to the core 100 by means of two connection members 210a, 210b. The connection members 210a, 210b are located at connection points in peripheral positions N1, L2 substantially coinciding with the nodes and loops of the natural resonance pattern, as defined above.

In this example, both connection points coincide with nodes N1 of the second mode of vibration and with loops L2 of the third mode of vibration. Therefore, the connections will be radially displaced during operation under influence from the third mode only. More precisely, the upper connection member 210a of the right side yoke 208 will move radially outwards simultaneously as the lower connection member 210b will move radially inwards to the same degree, in accordance with the loops L2 of the third mode of vibration. Correspondingly, the upper connection member 210a of the left side yoke 208 will move radially inwards as the lower connection member 210b will move radially outwards.

Furthermore, each yoke 208 is connected to the foundation 206 by means of a non-rigid connection 212 located somewhere between the upper and lower connection points 210a, 210b of the core 100. The non-rigid connection 212 may preferably be a pivotal connection. Ideally, the non-rigid connection 212 should be located at a pivotal centre of the deflections at connection points 210a, 210b, in order to minimise any bending force at the connection members. In practice, however, the non-rigid connection 212 may be arranged closer to the core periphery, as in the example of FIG. 2, in order to save space.

By this inventive arrangement, the transfer of vibrations in the stator core 100, according to the resonance pattern described above, to the foundation 206 will effectively be reduced by transferring the radial deflections of the core at the respective connection points 210a,b into a rocking movement of the yokes 208 around the non-rigid connections 212. No movement or vibration is then transferred to the foundation 206.

It should be noted that each yoke must generally be connected to the stator core at two adjacent loops of one of the known second and third vibration modes, in order to attain the rocking movement of the yoke around its non-rigid connection to the foundation. If a yoke would be connected to the stator core at two opposite loops of one of the vibration modes, the yoke would become deformed, which can easily be understood.

Figure 3:
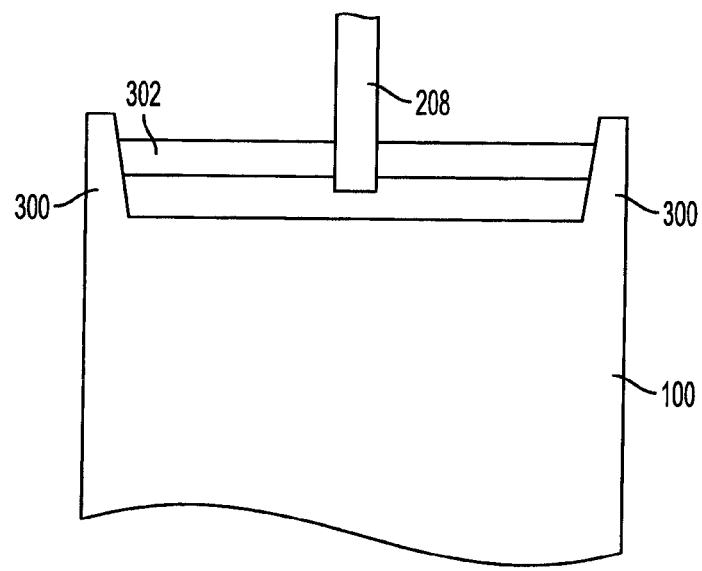
FIG. 3 is a more detailed view of a second embodiment of a stator suspension structure.

A second preferred embodiment will now be described with reference to FIG. 3, which illustrates one of the connection members 210a,b between the yoke 208 and the stator core 100 of FIG. 2. In this embodiment, the core 100, which is only partly shown, is provided with a pair of radial flanges or lugs 300 to which a beam 302 is connected axially extending therebetween. At least one of the connection members 210a,b preferably comprises a resilient connection, although in some cases, a fixed connection may be acceptable.

Further, the beam 302 may be resilient to a certain degree for absorbing sudden shock pulses in a tangential direction, e.g., due to a short circuit or a synchronising fault, as described above. This will isolate and protect the other suspension parts and the foundation from such shock pulses. Further, any slight radial displacement between the yoke 208 and the flanges or lugs 300 can be absorbed, which will arise if the non-rigid connection 212 is not located at the pivotal centre of the rocking movement of the yoke 208.

In FIG. 2, two opposite yokes are shown as a possible implementation of the inventive concept, each yoke having two connection points to the stator core located at upper and lower loops, respectively, of the third vibration mode. Other variants are also possible, such as those schematically illustrated in FIGS. 4 and 5. In general, any number of yokes may be used at any circumferential and/or axial positions, as long as they are connected to the stator core at two adjacent loops of one of the vibration modes, and consequently at two nodes of the other mode.

Figure 4:
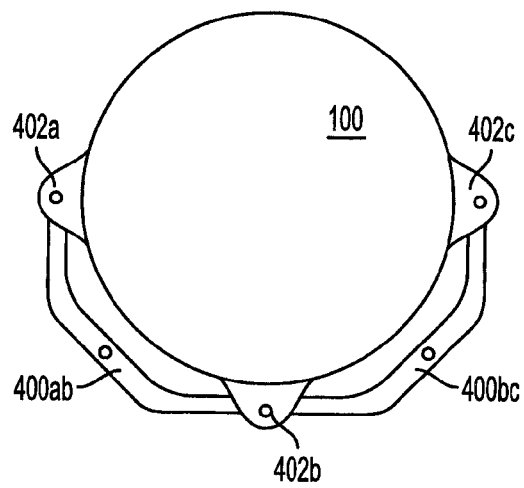
FIGS. 4 and 5 illustrate two alternative embodiments to the first embodiment.

In FIG. 4, two yokes 400ab, 400bc are connected to a stator core 100 at adjacent loops L1 of the second vibration mode, as defined in FIG. 1a. Each yoke 400ab,bc has an upper connection member 402a,c and a lower connection member 402b. In this example, the lower connection members 402b of the two yokes coincide circumferentially, but may be displaced axially. Each yoke 400ab,bc is further non-rigidly connected to a foundation, not shown.

Figure 5:
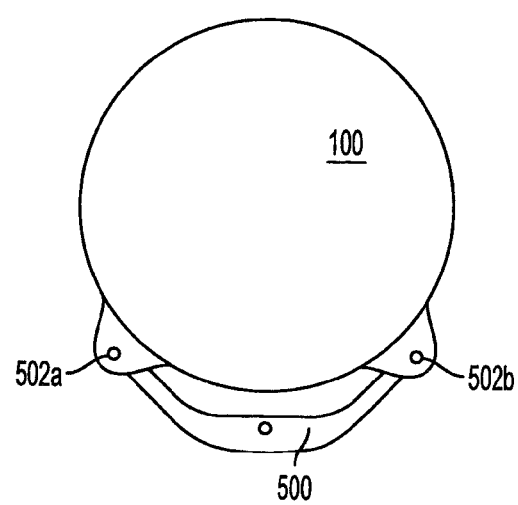

In FIG. 5, a yoke 500 is connected to a stator core 100 at two adjacent loops L2 of the third vibration mode, as defined in FIG. 1b. 502a and 502b denote its two connection members. Further support in a horizontal direction must also be provided in this case, not shown.

The different yoke connections shown in FIGS. 2, 4 and 5 described above may of course be used in any combination, e.g., at different axial positions.

The connection members between the yoke and the stator core, as well as the pivotal connection between the yoke and the foundation, may be designed in any suitable manner, as will be readily understood by one skilled in the art.

By using the described invention for suspending a stator core in an electric generator upon a foundation, vibrations in the stator core excited by a rotating magnetic field are effectively isolated from the foundation.

While the invention has been described with reference to specific exemplary embodiments, the description is only intended to illustrate the inventive concept and should not be taken as limiting the scope of the invention. Various alternatives, modifications and equivalents may be used without departing from the spirit of the invention, which is defined by the appended claims.

The invention claimed is:

1. A suspension apparatus for suspending a ring-shaped or tube-shaped stator core in an electric generator upon a foundation, wherein natural modes of vibration are excited in the stator core during operation, including known second vibration mode with four circumferentially distributed loops and four nodes being displaced 45 degrees from the loops, and a known third vibration mode with four loops and four nodes displaced 45 degrees in relation to the loops and nodes of the second vibration mode, comprising:

two yokes pivotally connected to the foundation at opposite sides of the stator core, each yoke being connected to the stator core at an upper and a lower connection point;

a non-rigid connection connecting the two yokes and the foundation; and two connection members connecting the two yokes and the stator core at connection points on opposite sides of the non-rigid connection;

wherein the connection points are located on the stator core substantially at two adjacent loops of one of the second and third vibration modes, such that radial deflections of the stator core at the respective connection points are transferred into a rocking movement of the yoke around the non-rigid connection.

2. A suspension apparatus according to claim 1, wherein at least one of the connection members between the yoke and the stator core conspires a resilient connection.

3. A suspension apparatus according to claim 1, wherein the lower connection points of the two yokes coincide circumferentially.

4. A suspension apparatus according to claim 1 wherein each connection member between the yoke and the stator core includes a beam extending axially between two flanges or lugs on the stator core.

5. A suspension apparatus according to claim 4, wherein the beam is resilient for absorbing sudden shock pulses of the stator core in a tangential direction.

6. A method of suspending a ring-shaped or tube-shaped stator core in an electric generator upon a foundation, wherein natural modes of vibration are excited in the stator core during operation, including a known second vibration mode with four circumferentially distributed loops and four nodes being displaced 45 degrees from the loops, and a known third vibration mode with four loops and four nodes displaced 45 degrees in relation to the loops and nodes of the second vibration mode, the method comprising:

connecting two yokes to the foundation on opposite sides of the stator core with a pivoting connection, each yoke being connected to the stator core at an upper and lower connection point; and connecting the two yokes to the stator core at connection points on opposite sides of the non-rigid connection with two connection members, wherein the two connection points are located on the stator core substantially at two adjacent loops of one of the second and third vibration modes, such that radial deflections of the stator core at the respective connection points are transferred into a rocking movement of the two yokes around the pivoting connection.

* * * * *